United States Patent
Li et al.

(10) Patent No.: US 11,567,210 B2
(45) Date of Patent: Jan. 31, 2023

(54) LIDAR FOR VEHICLE BLIND SPOT DETECTION

(71) Applicant: Nuro, Inc., Mountain View, CA (US)

(72) Inventors: Hao Li, San Jose, CA (US); Yun Zhang, San Jose, CA (US)

(73) Assignee: NURO, INC., Mountain View, CA (US)

( * ) Notice: Subject to any disclaimer, the term of this patent is extended or adjusted under 35 U.S.C. 154(b) by 618 days.

(21) Appl. No.: 16/682,235

(22) Filed: Nov. 13, 2019

(65) Prior Publication Data

US 2020/0150278 A1    May 14, 2020

Related U.S. Application Data

(60) Provisional application No. 62/760,648, filed on Nov. 13, 2018.

(51) Int. Cl.
| | |
|---|---|
| *G01S 17/00* | (2020.01) |
| *G01S 17/931* | (2020.01) |
| *G01S 7/481* | (2006.01) |
| *G01S 3/789* | (2006.01) |
| *G01S 17/02* | (2020.01) |
| *G01S 17/74* | (2006.01) |

(52) U.S. Cl.
CPC ............ *G01S 17/931* (2020.01); *G01S 3/789* (2013.01); *G01S 7/4815* (2013.01); *G01S 7/4817* (2013.01); *G01S 17/02* (2013.01); *G01S 17/74* (2013.01)

(58) Field of Classification Search
USPC ........................................................ 356/5.01
See application file for complete search history.

(56) References Cited

U.S. PATENT DOCUMENTS

| | | |
|---|---|---|
| 8,836,922 B1 | 9/2014 | Pennecot et al. |
| 9,086,273 B1 | 7/2015 | Gruver et al. |
| 9,618,742 B1 | 4/2017 | Droz et al. |
| 9,772,399 B2 | 9/2017 | Schwarz et al. |
| 9,823,351 B2 | 11/2017 | Haslim et al. |
| 9,897,687 B1 | 2/2018 | Campbell et al. |
| 10,788,572 B2 * | 9/2020 | Hartmann ............... G01S 17/42 |

(Continued)

FOREIGN PATENT DOCUMENTS

| | | |
|---|---|---|
| EP | 2124069 A1 | 11/2009 |
| EP | 2388615 A1 | 11/2011 |
| WO | 2017/135224 A1 | 8/2017 |

OTHER PUBLICATIONS

International Search Report and Written Opinion in counterpart International Application No. PCT/US2019/060921, dated Feb. 13, 2020, 13 pages.

*Primary Examiner* — James R Hulka

(57) ABSTRACT

A system is presented in accordance with aspects of the present disclosure. In various embodiments, the system includes a light source configured to emit light, an emitting lens positioned to obtain the emitted light and configured to produce a shaped beam, an optical element positioned to obtain the shaped beam and redirect the shaped beam toward a near field object to produce scattered light from the near field object, and to obtain and redirect at least a portion of the scattered light, and a collection lens configured to focus the at least the portion of the scattered light on a light detector.

20 Claims, 13 Drawing Sheets

(56) References Cited

U.S. PATENT DOCUMENTS

| | | | |
|---|---|---|---|
| 10,795,019 B2 * | 10/2020 | Imai | G01S 17/04 |
| 10,942,272 B2 * | 3/2021 | Droz | G01S 17/89 |
| 10,976,413 B2 * | 4/2021 | Han | G01S 17/931 |
| 2014/0168631 A1 * | 6/2014 | Haslim | G01S 7/4812 |
| | | | 356/4.01 |
| 2016/0306032 A1 * | 10/2016 | Schwarz | G01S 7/497 |
| 2017/0090032 A1 | 3/2017 | Ridderbusch | |
| 2017/0350966 A1 | 12/2017 | Hartmann et al. | |
| 2018/0003821 A1 | 1/2018 | Imai | |
| 2018/0164439 A1 | 6/2018 | Droz et al. | |
| 2018/0231640 A1 | 8/2018 | Han et al. | |
| 2018/0372491 A1 | 12/2018 | Noguchi | |

\* cited by examiner

LIDAR FOR VEHICLE BLIND SPOT DETECTION

CROSS-REFERENCE TO RELATED APPLICATIONS

The present application claims the benefit of and priority to U.S. Provisional Application No. 62/760,648, filed on Nov. 13, 2018, the entire contents of which are hereby incorporated by reference herein.

TECHNICAL FIELD

The present application relates to autonomous vehicles, and in particular, to LiDAR systems and methods for vehicle blind spot detection.

BACKGROUND

Light detection and ranging (LiDAR) is a technology that can be used to measure distances to remote targets. Typically, a LiDAR system includes a light source and a detector. The light source emits light towards a target which then scatters the light. Some of the scattered light is received back at the detector. The system determines the distance to the target based on one or more characteristics associated with the returned light. For example, the system may determine the distance to the target based on the time of flight of the returned light.

Light detectors, such as photodiodes, avalanche photo diodes (APDs), can be used to detect light that is imparted on their surfaces by, for example outputting an electrical signal, such as a voltage or a current, that corresponds to an intensity of light. Such devices are commonly fabricated out of semiconductor materials, such as silicon or GaN. In order to detect light over a substantial geometric area, multiple light detectors can be arranged into arrays connected in parallel.

In view of the characteristics of LiDAR technology, there is interest in developing applications for LiDAR systems and methods.

SUMMARY

This disclosure relates to a short range LiDAR systems and methods and, in particular, to short range LiDAR systems and methods for blind spot detection. In one aspect, the present disclosure provides short range LiDAR systems for autonomous robot vehicles.

In accordance with aspects of the present disclosure, a system includes a light source configured to emit light, an emitting lens, an optical element, and a collection lens. The emitting lens is positioned to obtain the emitted light and configured to produce a shaped beam. The optical element includes a mirror having a rotational axis and is positioned to: obtain the shaped beam and redirect the shaped beam toward a near field object to produce scattered light from the near field object, and obtain and redirect at least a portion of the scattered light. The collection lens is configured to focus the at least the portion of the scattered light on a light detector and includes a tangential plane. The emitting lens includes a tangential plane coincident with the rotational axis of the optical element and coincident with the tangential plane of the collecting lens.

In various embodiments of the system, the mirror includes a prism, a flat mirror, and/or a wedge mirror.

In various embodiments of the system, the mirror includes a mirror with a separation and/or a collection of mirrors.

In various embodiments of the system, the system further includes a processor and a memory. The memory includes instructions which, when executed by the processor, cause the system to detect an object based on the portion of the scattered light on the light detector.

In various embodiments of the system, the mirror includes a rotating speed. The instructions, when executed by the processor, further cause the system to: determine a rate of detection, and determine the rotating speed of the mirror based on the rate of detection and/or a field of view.

In various embodiments of the system, the light source is a linear light source.

In various embodiments of the system, the light source includes a laser diode array.

In various embodiments of the system, the light source includes at least one of ultraviolet, visible, or near-infrared light.

In various embodiments of the system, the light detector includes a photodiode, a photomultiplier, and/or an avalanche photodiode array.

In various embodiments of the system, the emitting lens includes a diffractive optical element and/or an array of lenses.

In various embodiments of the system, the system includes: a second light source configured to second emit light, a second emitting lens, and a second collection lens. The second emitting lens is positioned to obtain the second emitted light and configured to produce a second shaped beam. The optical element is positioned to obtain the second shaped beam and redirect the second shaped beam toward the near field object to produce second scattered light from the near field object, and to obtain and redirect at least a portion of the second scattered light. The second collection lens is configured to focus the at least the portion of the second scattered light on a second light detector, and the second collection lens includes a tangential plane. The second emitting lens includes a tangential plane coincident with the rotational axis of the optical element and coincident with the tangential plane of the second collecting lens.

In accordance with aspects of the present disclosure, a method includes emitting light from a light source, producing a shaped beam by an emitting lens positioned to obtain the emitted light, obtaining the shaped beam by an optical element and redirecting the shaped beam, by the optical element, toward a near field object to produce scattered light from the near field object, obtain and redirect by the optical element at least a portion of the scattered light, and focus by a collection lens the at least the portion of the scattered light on a light detector.

In various embodiments of the method, the optical element includes a mirror having a rotational axis, the collection lens includes a sagittal plane coincident with and/or parallel to a sagittal plane of the emitting lens, and the collection lens and the emitting lens are distributed on a left side and a right side of the rotational axis of the mirror, where the tangential planes of both the emitting lens and the collection lens are parallel to the rotation axis.

In various embodiments of the method, the optical element may include a mirror having a rotational axis, the collection lens includes a tangential plane, and the emitting lens includes a tangential plane coincident with the rotational axis of the optical element and coincident with the tangential plane of the collecting lens.

In various embodiments of the method, the mirror includes a mirror with a separation or a collection of mirrors.

In various embodiments of the method, the method includes detecting an object based on the portion of the scattered light on the light detector.

In various embodiments of the method, the mirror includes a rotating speed. The method further includes determining a rate of detection and determining the rotating speed of the mirror based on the rate of detection and/or a field of view.

In various embodiments of the method, the light source is a linear light source.

In various embodiments of the method, the light source includes a laser diode array.

In accordance with aspects of the present disclosure, the system includes a light source configured to emit light, an emitting lens, an optical element, and a collection lens. The emitting lens is positioned to obtain the emitted light and configured to produce a shaped beam. The optical element includes a mirror having a rotational axis and is positioned to: obtain the shaped beam and redirect the shaped beam toward a near field object to produce scattered light from the near field object, and obtain and redirect at least a portion of the scattered light. The collection lens is configured to focus the at least the portion of the scattered light on a light detector. A sagittal plane of the collection lens and a sagittal plane of the emitting lens are coincident. The collection lens and the emitting lens are distributed on a left side and a right side, respectively, of the rotational axis of the mirror.

Further details and aspects of exemplary embodiments of the present disclosure are described in more detail below with reference to the appended figures.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying drawings of which.

DETAILED DESCRIPTION

This disclosure relates to LiDAR systems and methods for vehicle blind spot detection. In one aspect, the present disclosure provides blind spot detection for autonomous vehicles.

Figure 1:
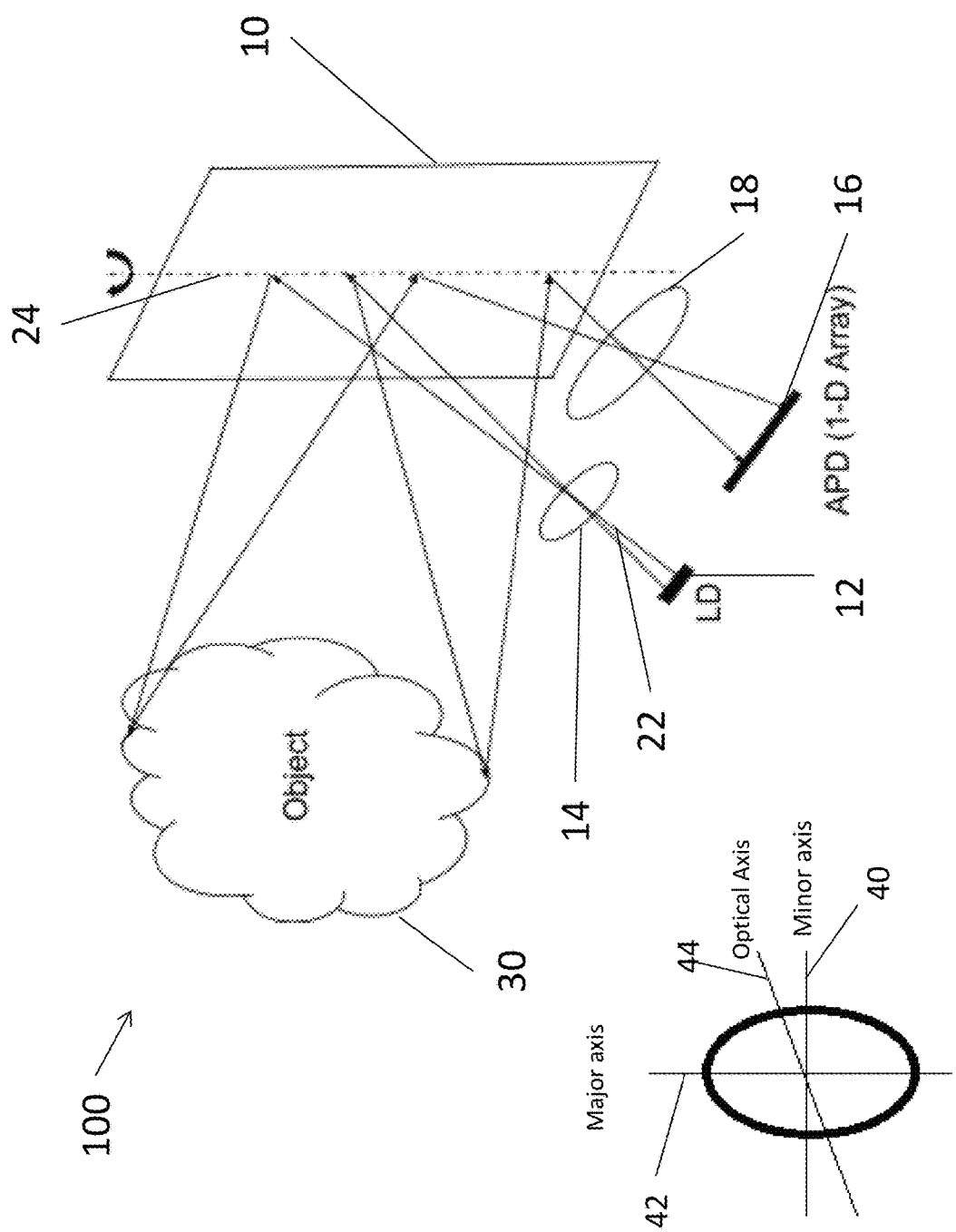
FIG. 1 is a diagram of an exemplary configuration of a LiDAR system, in accordance with aspects of the present disclosure.

FIG. 1 is an exemplary embodiment of a LiDAR system in accordance with aspects of the present disclosure. The system 100 includes a scanning mirror 10, a light source or laser diode (LD) 12, an emitting lens 14, a collection lens 18, a controller 600 (FIG. 6), and a light detector 16. In various embodiments, the light source 12 may be a single laser diode cell or a laser diode array. In various embodiments, the light source or laser diode 12 can be a linear light source. In various embodiments, the light source may be a laser diode array that generates a collection of points in a line, such as, for example, a vertical line. In various embodiments, the light source may include a light-emitting diode (LED) or may provide a vertical-cavity surface-emitting laser (VCSEL). In various embodiments, the light source may produce ultraviolet, visible, or near-infrared light. In various embodiments, the emitting lens 14 may be or may include a diffractive optical element and/or an array of lenses.

In various embodiments, the scanning mirror 10 may be a single-sided surface mirror or double-sided surface mirror. In various embodiments, the mirror may be a collection of mirrors or a mirror with a separation. The scanning mirror 10 rotates, and a motor (20, FIG. 3) can be used to rotate the scanning mirror 10. In various embodiments, the scanning mirror 10 and motor can rotate 360 degrees clockwise or counterclockwise. In various embodiments, the scanning mirror 10 and motor may oscillate clockwise and counterclockwise. The degree of oscillation can vary, and it is contemplated that different degrees of oscillation are encompassed by the present disclosure. The rotating speed may be determined by various parameters, such as rate of detection and/or field of view (FoV), among other things. In various embodiments, it is contemplated that the scanning mirror may be replaced by another type of optical element, such as a prism. In various embodiments, the scanning mirror may include one side, double sides, and/or multiple sides.

With continuing reference to FIG. 1, the light source or laser diode 12 emits a light beam or light bundle 22. The terms "light beam" and "light bundle" will be used interchangeably herein. The light bundle 22 emitted from the light source or laser diode 12 enters the emitting lens 14 and is collimated/converged in the horizontal direction and spread out/diverged in the vertical direction by the emitting lens 14 to produce a shaped beam exiting the emitting lens 14. In various embodiments, vertical direction refers to a direction that is parallel to an axis of rotation 24 of the scanning mirror 10. In various embodiments, vertical direction refers to a direction that is orthogonal to the ground where the scanning mirror 10 is located. As used herein, horizontal direction refers to a direction that is orthogonal to the vertical direction and that may be within the plane of the scanning mirror 10.

The scanning mirror 10 receives the shaped beam and redirects the shaped beam towards a near field object 30, thereby illuminating the object 30. The shaped beam that is directed to the object 30 scatters off of the object 30 to produce scattered light from the object 30. The scanning mirror 10 receives some of the scattered light and redirects the scattered light to a collection lens 18, which focuses the scattered light onto the light detector 16.

The light detector 16 may include photodiodes, silicon photomultipliers (SiPM), single photon avalanche diode (SPAD), SPAD arrays, and/or avalanche photodiode (APD) arrays, which may be used to detect light that is imparted on their surfaces and output an electrical signal, such as a voltage or a current, that corresponds to an intensity of light. As persons skilled in the art will understand, an APD array generates a signal based on the amount and timing of the light it receives. In various embodiments, an APD may be an array of, for example, 16, 32, or 64 elements, or another number of elements. It is contemplated that electronics may read out sensing signals from an APD array sequentially (one cell at a time) or concurrently (multiple cells at a time). In various embodiments, where the light source (e.g., laser diode 12) generates a collection of points, the number of cells in the APD array can correspond with the number of points in the collection of points generated by the light source.

The embodiments described above are exemplary, and other components or types of components are contemplated to be within the scope of the present disclosure. For example, in various embodiments, the shaped beam may have a shape different from the embodiments described above herein. In various embodiments, the emitting lens can collimate/converge the emitted light in a first direction and diverge the emitted light in a second direction. The first and second directions may be orthogonal or may be oblique relative to each other, and may be formed in any direction in three-dimensional space. Such variations are contemplated to be within the scope of the present disclosure.

The system 100 estimates the distance of the object 30 based on one or more characteristics associated with the various light beams. For example, the system 100 may estimate the distance of the object 30 based on the time of flight of the various light beams. For example, the system may determine the time it takes for a given wavelength of the emitted light to be reflected off the object 30 and for that reflected light to be measured by the light detector 16. The object distance may be estimated by a controller, a processor, or a signal processing unit, among other types of processing devices. The object distance may then be used by a guidance system for an autonomous robot vehicle or a collision-avoidance system to assist an autonomous robot vehicle with safely navigating through environments and avoid colliding with objects.

With continuing reference to FIG. 1, and as persons skilled in the art will understand, a lens can be characterized by a tangential plane and a sagittal plane. In the illustration of FIG. 1, the tangential plane is a plane that encompasses the optical axis 44 and the major axis 42 of the lens, and the sagittal plane is a plane that encompasses the optical axis 44 and the minor axis 40 of the lens. In relation to these planes, the configuration of FIG. 1 is a configuration in which the tangential planes of the emitting lens 14 and the collection lens 18 are coincident with the rotational axis 24 of the scanning mirror 10.

As mentioned above, the shaped beam exiting the emitting lens 14 essentially forms a vertical line segment. Because the tangential plane of the emitting lens 14 is coincident with the rotational axis 24 of the scanning mirror 10, in FIG. 1, the shaped beam is directed to the rotational axis 24 of the scanning mirror 10. The scanning mirror 10 reflects the shaped beam and redirects the shaped beam towards a near field object 30. For example, the object 30 could be a person, another vehicle, or a road hazard. The shaped beam directed to the near field object 30 reflects from the near field object 30 to produce scattered light. In various embodiments, the scanning mirror 10 receives and reflects a portion of the scattered light. In the configuration of FIG. 1, the tangential plane of the collection lens 18 is coincident with the rotational axis 24 of the scanning mirror. In various embodiments, the collection lens 18 is positioned and configured such that only light reflected off the rotational axis 24 may be directed by the collection lens 18 to the light detector 16. Thus, although the scanning mirror 10 may receive and reflect scattered light across its surface, only light reflected off the rotational axis 24 may be directed by the collection lens 18 to the light detector 16. In various embodiments, the positions of the light detector 16 and the laser diode 12 may be exchanged. For example, the light detector 16 may be above the laser diode 12, and the laser diode 12 may be below the light detector 16.

Figure 2:
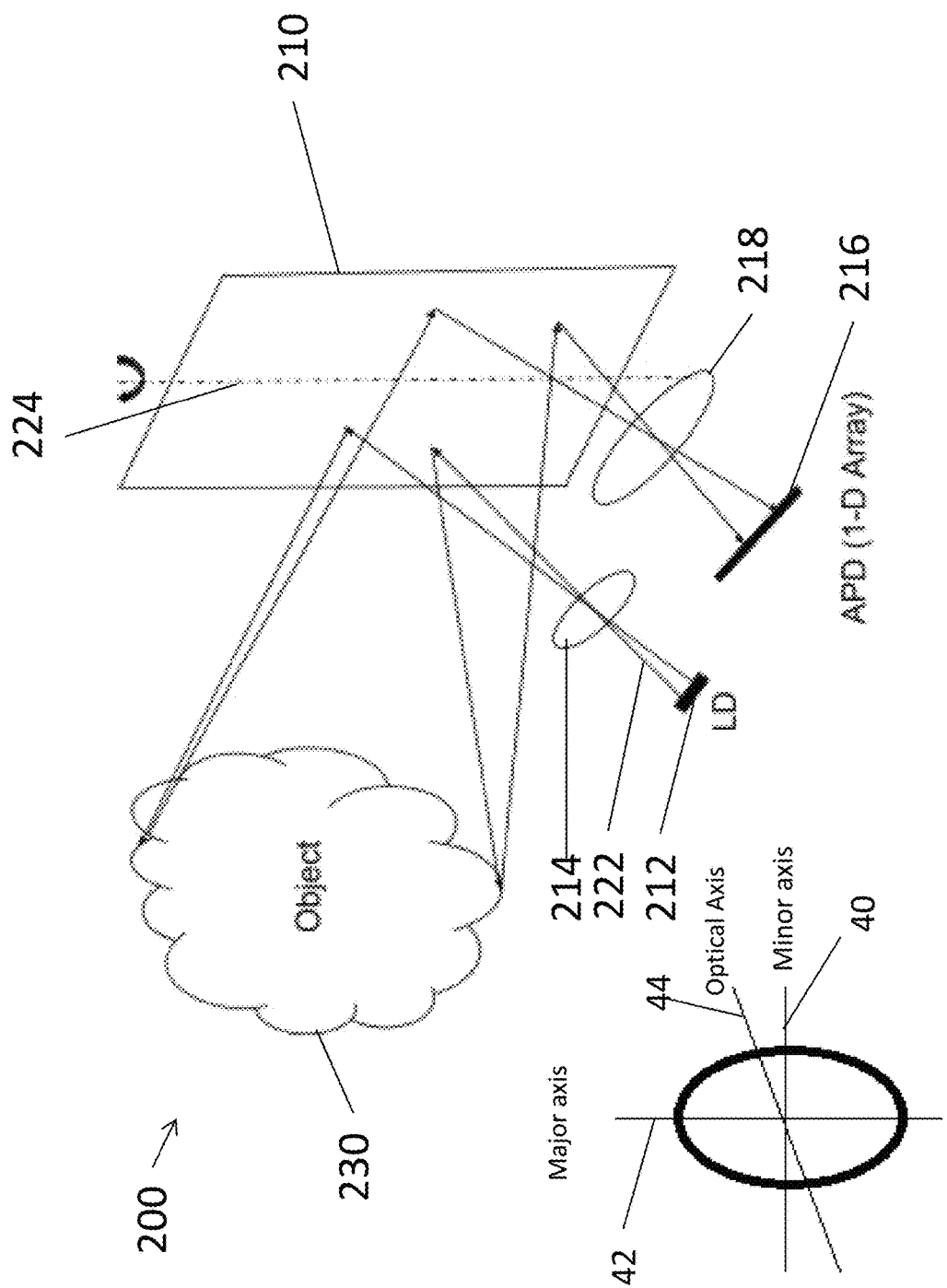
FIG. 2 is a diagram of another exemplary configuration of a LiDAR system, in accordance with aspects of the present disclosure.

FIG. 2 is a diagram of a second configuration of a LiDAR system 200 in accordance with aspects of the present disclosure. In this second configuration, the tangential plane of the emitting lens 214 and the collection lens 218 are distributed on the left side and the right side, respectively, of the rotational axis 224 of the scanning mirror 210, while the sagittal planes of the emitting lens 214 and the collection lens 218 are coincident.

As shown in FIG. 2, a light bundle 222 is emitted from the light source or laser diode 212. The emitting lens 214 is positioned such that the light bundle 222 enters the emitting lens 214. In various embodiments, the emitting lens 214 is configured to transform the light bundle 222 by collimating or converging the light bundle 222 in the horizontal direction and diverging or spreading out the light bundle 222 in the vertical direction, to produce a shaped beam that exits the emitting lens 214. By transforming the light bundle 222 in this manner, the shaped beam exiting the emitting lens 214 essentially forms a vertical line segment. Because the tangential plane of the emitting lens 214 is on the left side of the rotational axis 224 of the scanning mirror 210, in FIG. 2, the shaped beam is directed to the left side of the rotational axis 224 of the scanning mirror 210.

The scanning mirror 210 reflects the shaped beam and redirects the shaped beam towards a near field object 230. For example, the object 230 could be a person, another vehicle, or a road hazard. The shaped beam directed to the near field object 30 reflects from the near field object 230 to produce scattered light. In various embodiments, the scanning mirror 210 receives and reflects a portion of the scattered light. In the configuration of FIG. 2, the tangential plane of the collection lens 218 is on the right side of the rotational axis 224 of the scanning mirror. In various embodiments, the collection lens 218 is positioned and configured such that only light reflected off the intersection of the scanning mirror 210, and the collection lens tangential plane may be directed by the collection lens 218 to the light detector 216. Thus, although the scanning mirror 210 may receive and reflect scattered light across its surface, only light reflected off the intersection of the scanning mirror 210, and the collection lens tangential plane may be directed by the collection lens 218 to the light detector 216. In various embodiments, the positions of the light detector 216 and the laser diode 212 may be exchanged. For example, the light detector 216 may be on left, and the laser diode 212 may be on the right.

Figure 3:
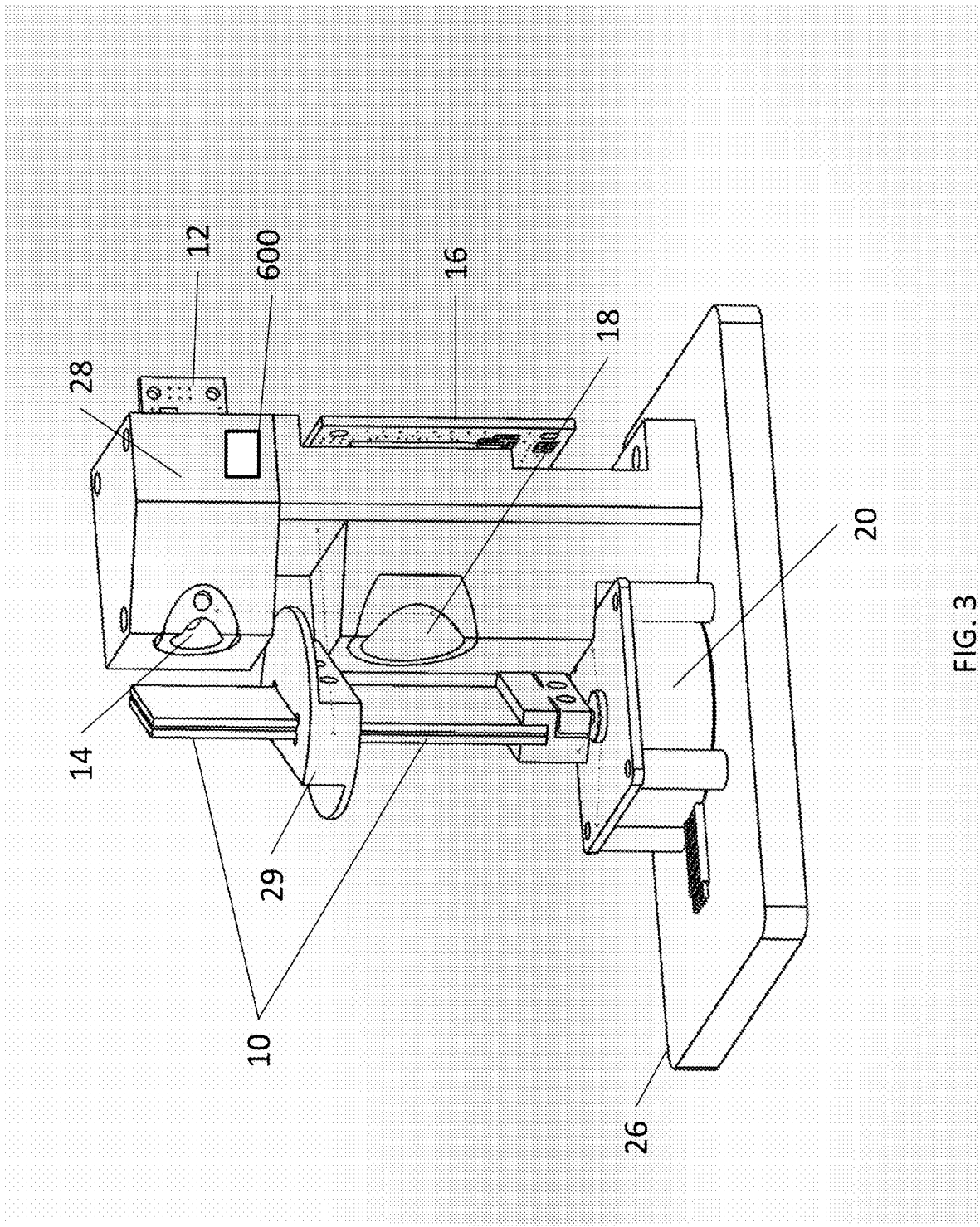
FIG. 3 is a diagram of an exemplary embodiment of the LiDAR system of FIG. 1, in accordance with aspects of the present disclosure.

With reference to FIG. 3, an exemplary embodiment of the LiDAR system of FIG. 1 is shown, in accordance with aspects of the present disclosure. A housing 28 includes an upper portion and a lower portion. An emitting lens 14 and a light source (e.g., laser diode 12) are disposed in the upper portion of the housing 28. The emitting lens 14 is positioned to receive light emitted from the laser diode 12 and produce a shaped beam, as described in connection with FIG. 1.

In various embodiments, a motor 20 is rotatably coupled to the scanning mirror 10 and is disposed on the base 26. The mirror 10 is positioned to receive the shaped beam emitted by the emitting lens 14 and redirect the shaped beam towards a near field object within a field of view of the rotating mirror 10.

Figure 4:
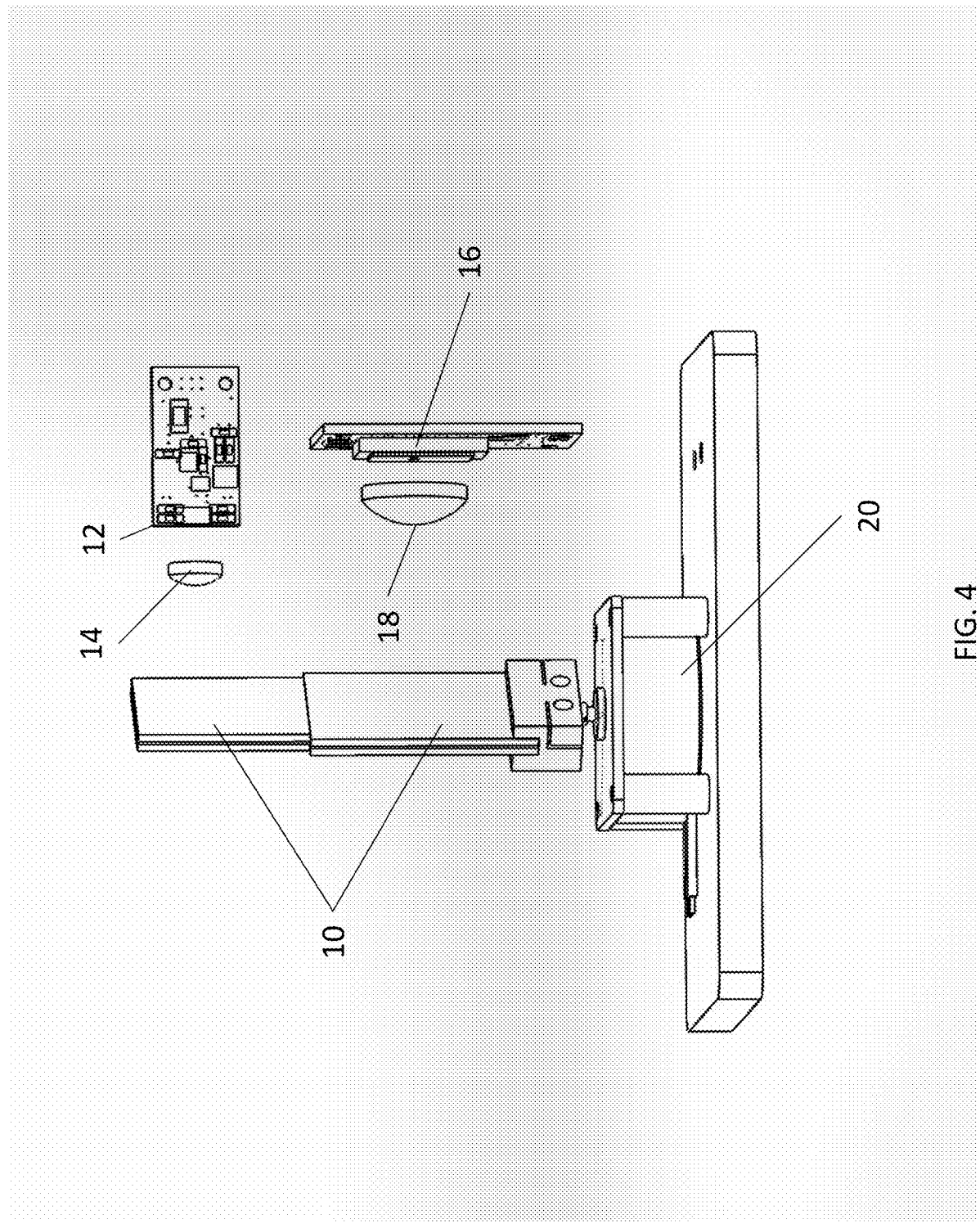
FIG. 4 is a diagram of various components of the LiDAR system of FIG. 3, in accordance with aspects of the present disclosure.

In the illustrated embodiment, a collection lens 18 and a light detector 16 are located at the lower portion of the housing 28. The housing 28 is disposed on a base 26. The embodiment of FIG. 3 is configured such that the tangential planes of the emitting lens 14 and the collection lens 18 are coincident with the rotational axis of the scanning mirror 10. In various embodiments, a divider 29 is interposed between the end portions of the scanning mirror 10. The divider shields or isolates the light emitted from emitting lens 14 from directly reaching the collection lens 18. FIG. 4 shows a perspective view of the apparatus of FIG. 3, without the divider 29 and without the housing 28. As shown in FIG. 4, the scanning mirror 10 can be composed of two mirror segments that are coupled together.

Figure 5:
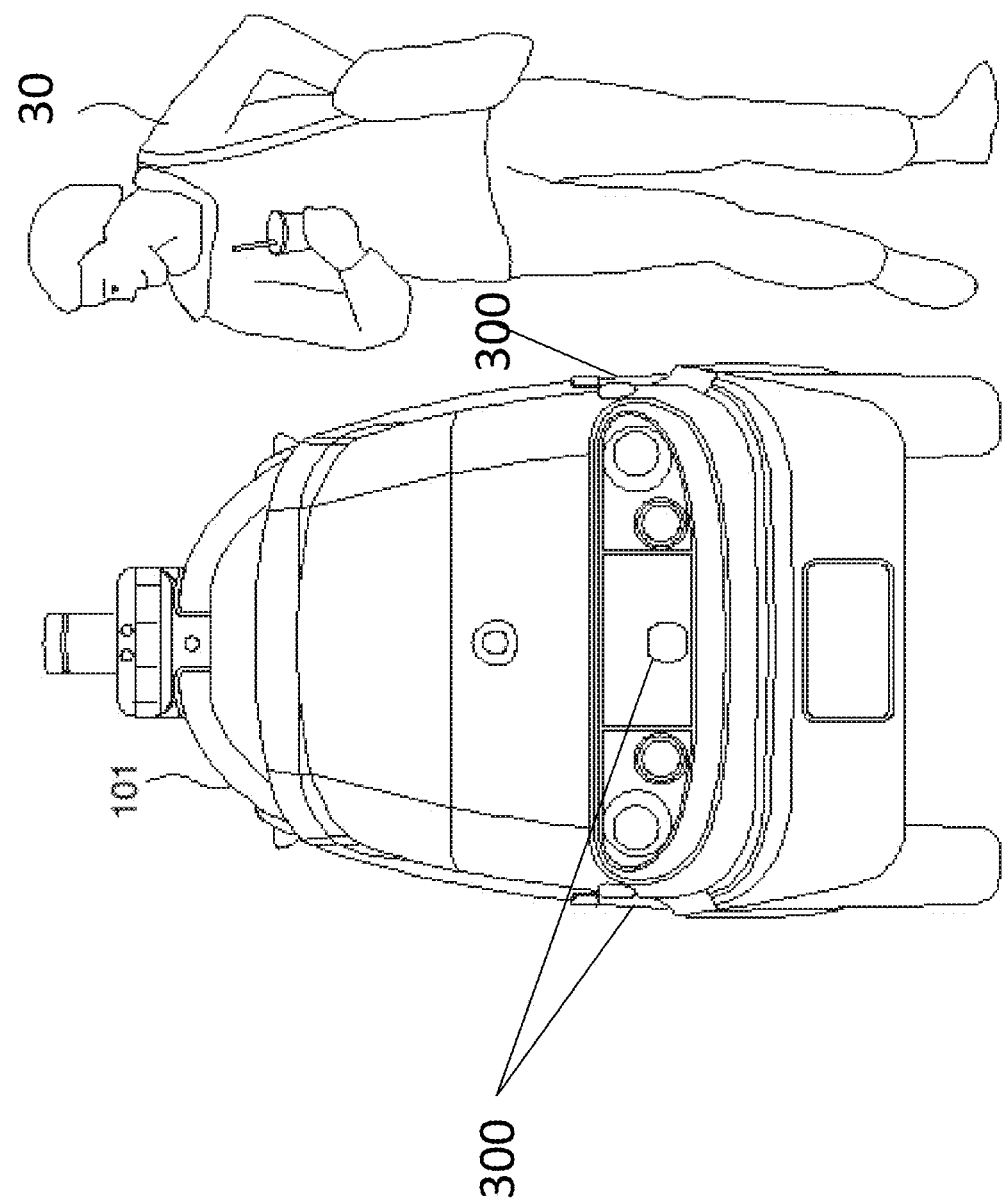
FIG. 5 is a diagram of an exemplary autonomous robot vehicle including a LiDAR system, in accordance with aspects of the present disclosure.

FIG. 5 depicts an exemplary view of an autonomous robot vehicle 101 that can include the LiDAR system described above herein. It is contemplated that any of the systems and/or configurations described above may be deployed on the autonomous robot vehicle 101 to enable blind spot detection. In contrast to LiDAR devices that are deployed on the top surface of a vehicle with rotating laser beams, the present disclosure contemplates that multiple LiDAR systems, as described herein, may be deployed on various sides of the autonomous robot vehicle 101. For example, the disclosed LiDAR systems may be deployed in or on the bumper, or on the sides of the doors. Based on such a deployment, the disclosed LiDAR systems may detect an object 30, such as a person within a few inches or less of the autonomous robot vehicle 101. The disclosed LiDAR systems can detect objects or persons at other distances as well. The data from the disclosed LiDAR system may be used by the vehicles' navigation system to avoid collision with the person or other object 30. Although an autonomous robot vehicle 101 is used in the present disclosure, the present disclosure is applicable to other types of vehicles as well, including manned and/or unmanned vehicles such as cars, trucks, planes, drones, aircraft, and watercraft.

Figure 6:
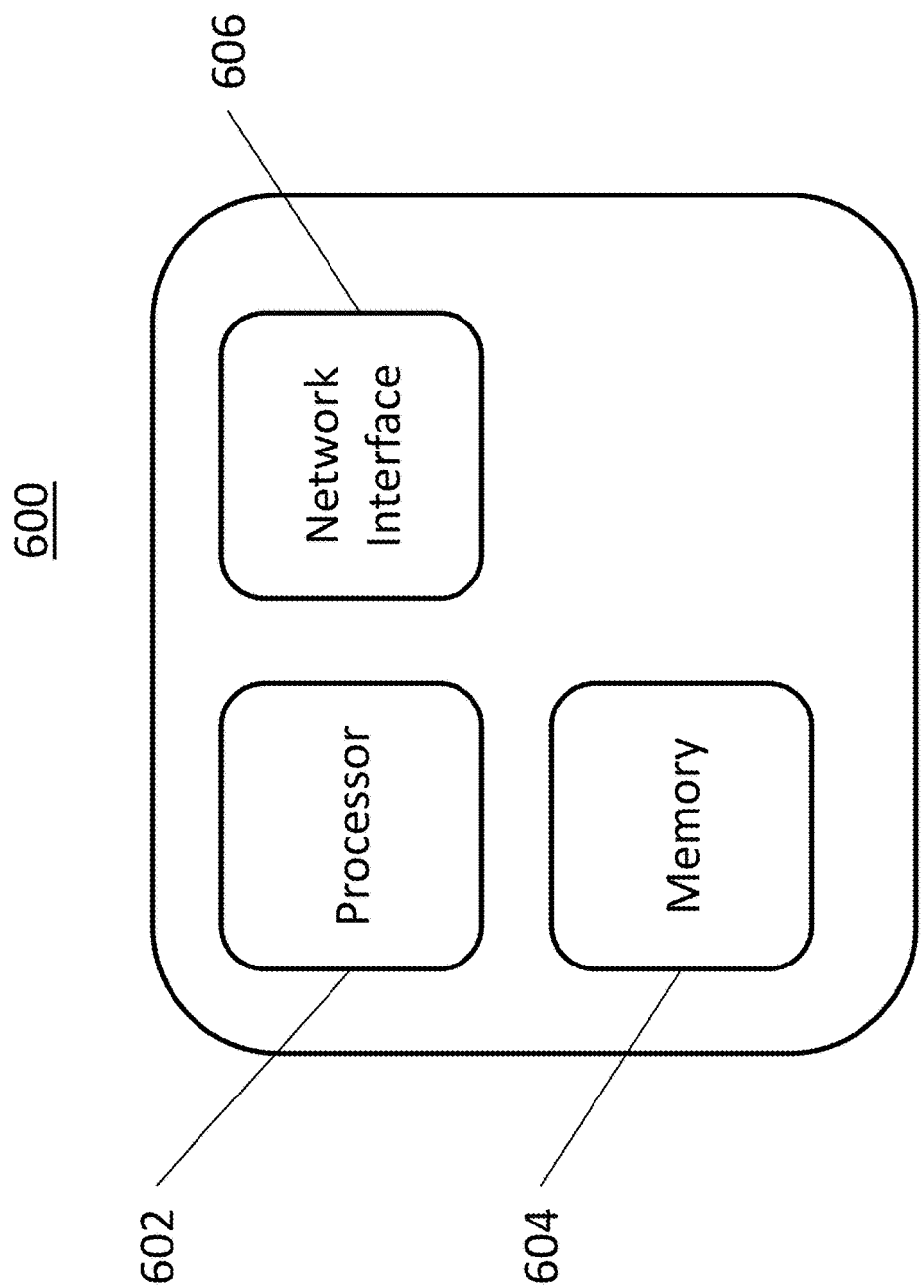
FIG. 6 is a block diagram of an exemplary controller, in accordance with aspects of the disclosure.

Referring to FIG. 6, there is shown a block diagram of a controller 600. The controller 600 includes processor 602 connected to a computer-readable storage medium or a memory 604, which may be a volatile type memory, such as RAM, or a non-volatile type memory, such as flash media, disk media, or other types of memory. In various embodiments, the processor 602 may be another type of processor such as, without limitation, a digital signal processor, a microprocessor, an ASIC, a graphics processing unit (GPU), field-programmable gate array (FPGA), or a central processing unit (CPU).

In various embodiments, the memory 604 can be random access memory, read-only memory, magnetic disk memory, solid state memory, optical disc memory, and/or another type of memory. In various embodiments, the memory 604 can be separate from the controller 600 and can communicate with the processor 602 through communication buses of a circuit board and/or through communication cables such as serial ATA cables or other types of cables. The memory 604 includes computer-readable instructions that are executable by the processor 602 to operate the controller 600. In various embodiments, the controller 600 may include a network interface 606 to communicate with other computers or a server.

Figure 7:
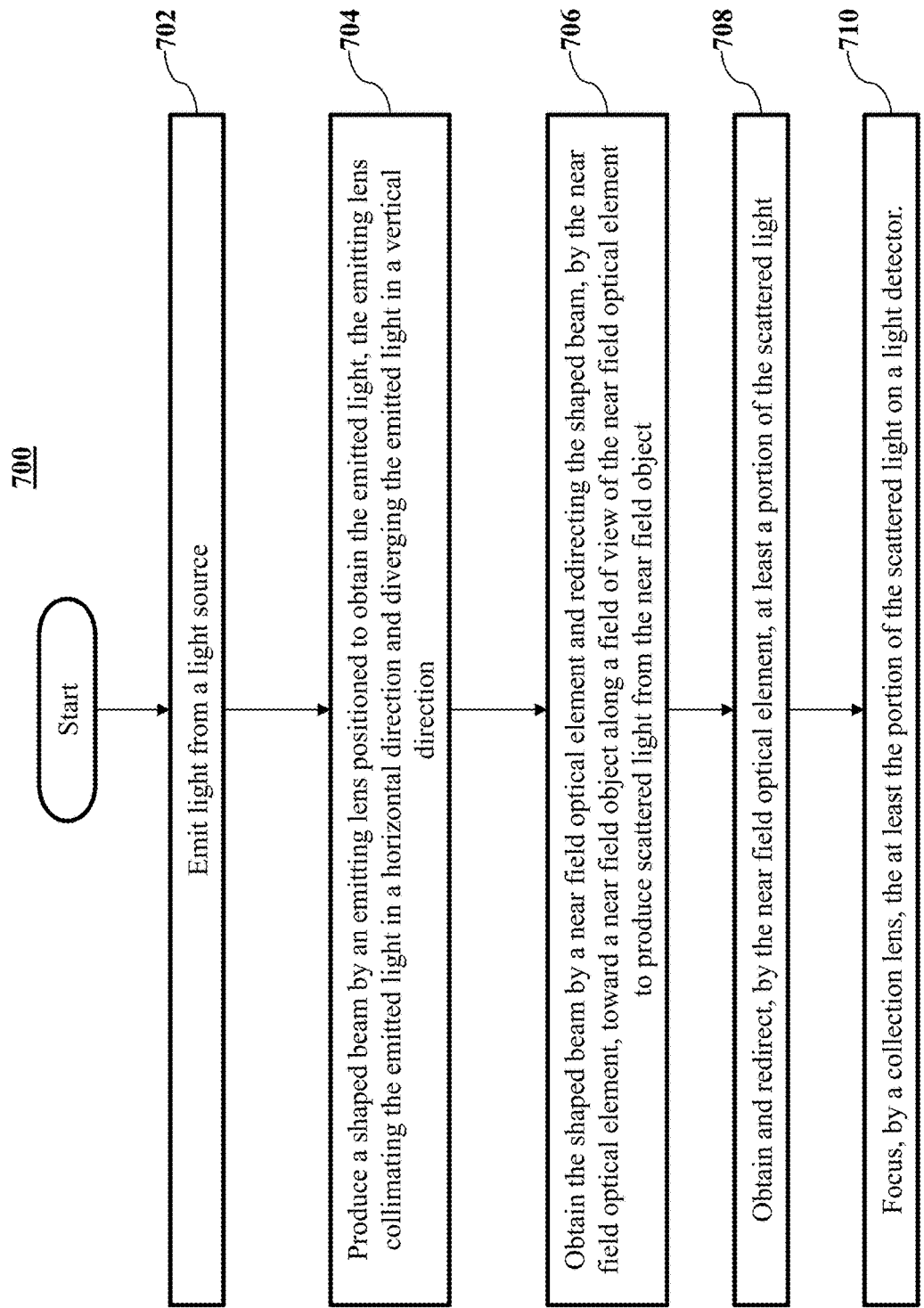
FIG. 7 is a flowchart of an exemplary method for blind spot detection, in accordance with aspects of the disclosure.

Referring now to FIG. 7, there is shown a flow diagram of a method 700 for blind spot detection. It is contemplated that one or more operations of the method 700 may be performed in a different order, repeated, and/or omitted without departing from the scope of the disclosure. In various embodiments, the illustrated method 700 can be controlled by the controller 600 (FIG. 6). Although the operations of FIG. 7 will be described with respect to blind spot detection, it will be understood that the illustrated operations are applicable to other systems and uses as well.

Initially, at step 702, the operation includes emitting light (e.g., light bundle) from a light source. In various embodiments, the light source may include a laser diode. In various embodiments, the light source may include a linear light source and/or a laser diode array. In various embodiments, the light source includes ultraviolet light, visible light, and/or near infrared light. For example, the light source may emit a light at a wavelength of 1000 nanometers.

At step 704, the operation includes producing a shaped beam by an emitting lens positioned to obtain the emitted light. The emitting lens collimates/converges the emitted light in a first direction, e.g., a horizontal direction, and diverges the emitted light in a second direction, e.g., a vertical direction.

At step 706, the operation includes obtaining the shaped beam by an optical element. The operation includes then redirecting the shaped beam, by the optical element, toward a near field object within a field of view of the optical element to produce scattered light from the near field object. For example, the near field object may include a person. The exemplary 1000 nanometer light may reflect from the person producing scattered light.

In various embodiments, the optical element may include a mirror having a rotational axis. In various embodiments, a sagittal plane of the collection lens and a sagittal plane of the emitting lens are coincident. In various embodiments, the collection lens and the emitting lens are distributed on a left side and a right side, respectively, of the rotational axis of the mirror.

In various embodiments, the optical element may include a mirror having a rotational axis. In various embodiments, the collection lens may include a tangential plane. In various embodiments, the emitting lens may include a tangential plane coincident with the rotational axis of the optical element and coincident with the tangential plane of the collecting lens.

At step 708, the operation includes obtaining and redirecting, by the optical element, at least a portion of the scattered light. For example, a portion of the scattered light produced from the person is obtained and redirected by a scanning mirror.

At step 710, the operation includes focusing, by a collection lens 18, the at least the portion of the scattered light on a light detector 16. In various embodiments, the light detector 16 may include a photodiode, a photomultiplier, and/or an avalanche photodiode array.

In various embodiments, the operation may detect an object based on the portion of the scattered light on the light detector. For example, the operation may detect the person based on the portion of scattered light. In various embodiments, the operation may determine a rate of detection and determine a mirror rotating speed based on at least one of a rate of detection or a field of view. In various embodiments, the guidance system of the autonomous robot vehicle may generate navigation instructions based on the detected object, the rate of detection, and/or the mirror rotating speed. For example, the autonomous robot vehicle may move more to the left if an object is detected too close to the right side of the autonomous robot vehicle.

Figure 8:
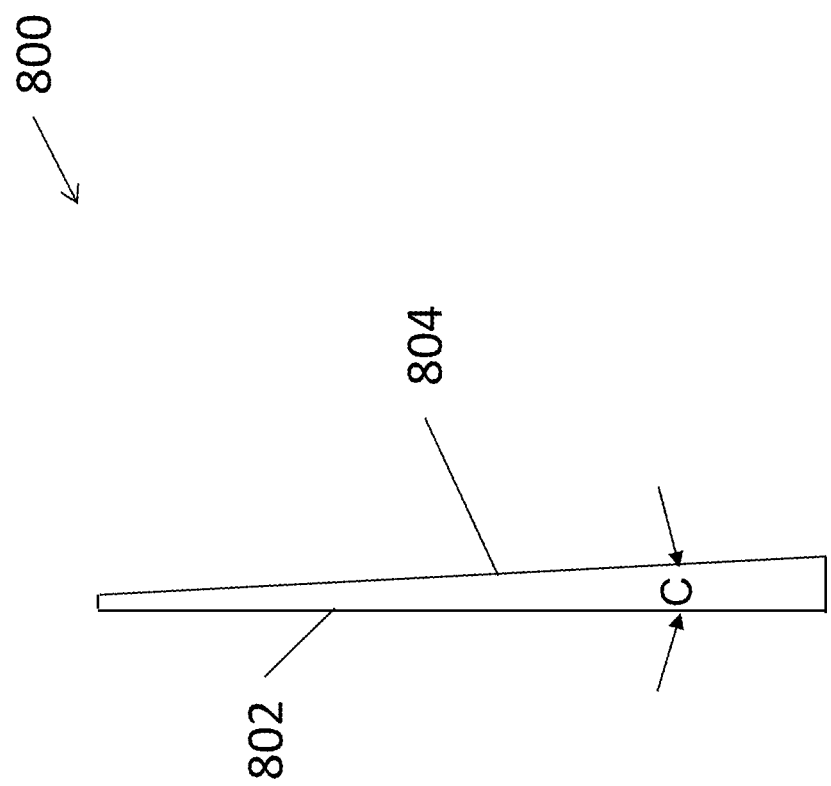
FIG. 8 is a diagram of an exemplary wedge mirror, in accordance with aspects of the disclosure.
Figure 9:
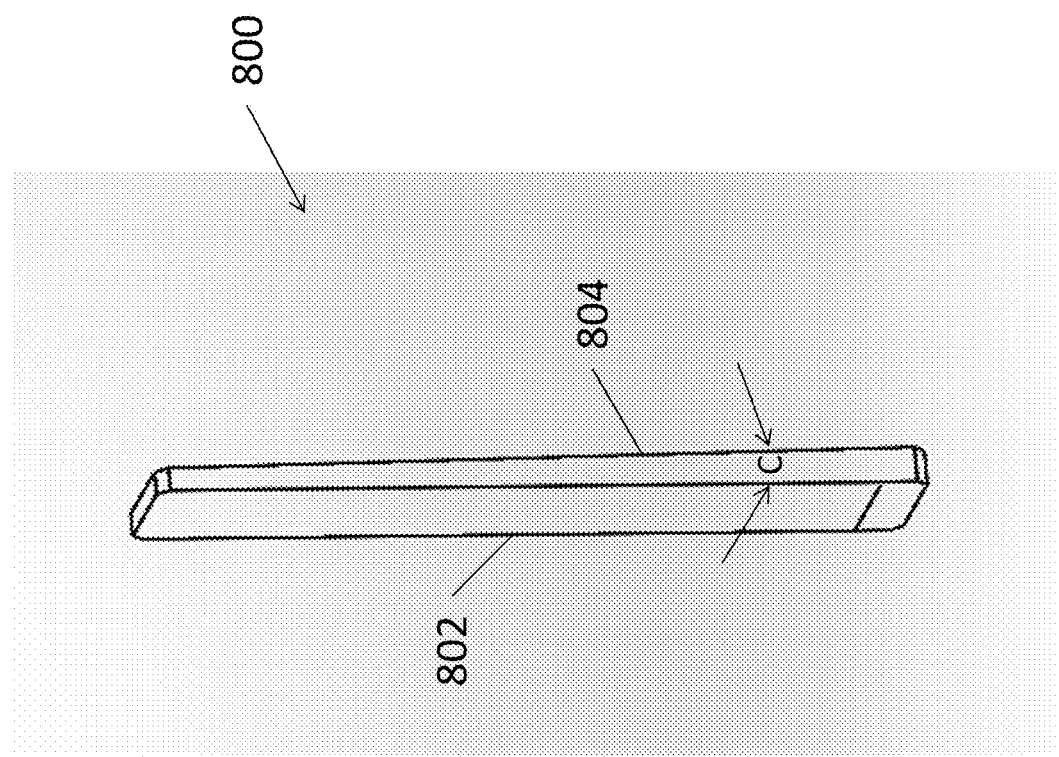
FIG. 9 is another diagram of the wedge mirror of FIG. 8, in accordance with aspects of the disclosure.

With reference to FIGS. 8 and 9, a wedge mirror 800 is shown in accordance with aspects of the present disclosure. In various embodiments, the wedge mirror 800 can be used in place of or in conjunction with a flat scanning mirror previously described herein. In the wedge mirror 800, there is an angle C between the mirror flat surface 802 and the mirror wedge surface 804. Both surfaces 802,804 are used to reflect light. As persons skilled in the art will understand, for an ideal plane-mirror and a fixed incident ray, the angle of incidence and the angle of reflection of the fixed incident ray are the same and can be denoted as θ relative to an orthogonal of the ideal plane-mirror. If the ideal plane-mirror is rotated by an angle of φ from its original position, the fixed incident ray will then have an angle of incidence and an angle of reflection of θ+φ, relative to an orthogonal of the rotated plane-mirror. Relative to the original light paths, incident light keeps the same path, while reflective light deflects by an angle of 2φ. Accordingly, the angle C in the wedge mirror operates to deflect the light path by 2C degrees compared with the light path of the flat side, as explained below in connection with FIG. 10.

Figure 10:
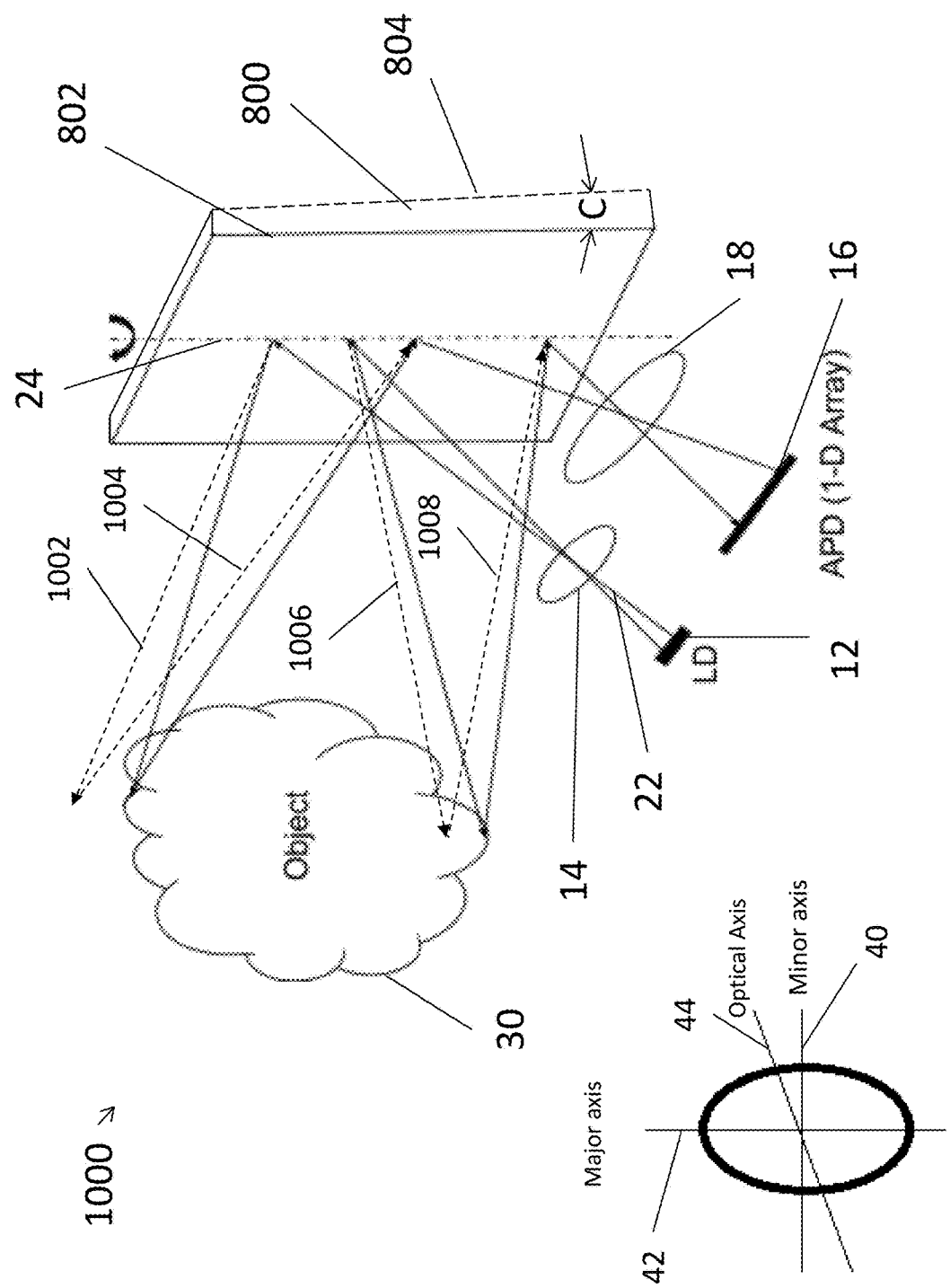
FIG. 10 is a diagram of an exemplary configuration of a LiDAR system using a wedge mirror, in accordance with aspects of the present disclosure.

With reference to FIG. 10, a configuration of a LiDAR system with the wedge mirror of FIG. 8 is shown in accordance with aspects of the present disclosure. The system 1000 includes a wedge mirror 800 (of FIG. 8), a light source 12, an emitting lens 14, a collection lens 18, a controller (not shown), and a light detector 16. The mirror flat surface 802 is illustrated by a solid line, whereas the wedge mirror surface 804 is illustrated by a dotted line. The paths of light rays which interact with the mirror flat surface 802 are the same as the paths shown in FIG. 1. The paths of light rays which interact with the mirror surface 804 and the object 30 are shown by dotted lines and include paths 1002-1008. The wedge mirror 800 rotates in operation, but it is illustrated in the same position in FIG. 10 for comparison purposes. In operation, the wedge mirror surface 804 would face the illustrated system components to produce the dotted light paths 1002-1008.

The light source or laser diode 12 emits a light beam or light bundle 22. The light bundle 22 emitted from the light source or laser diode 12 enters the emitting lens 14 and is collimated/converged in the horizontal direction and spread out/diverged in the vertical direction by the emitting lens 14 to produce a shaped beam exiting the emitting lens 14. In various embodiments, vertical direction and horizontal direction have the same meanings as described above herein.

The wedge mirror 800 receives the shaped beam and redirects the shaped beam towards a near field object 30, thereby illuminating the object 30. The shaped beam that is directed to the object 30 scatters off of the object 30 to produce scattered light from the object 30. The wedge mirror 800 receives some of the scattered light and redirects the scattered light to a collection lens 18, which focuses the scattered light onto the light detector 16. The dashed lines 1002-1008 are the light paths between the object 30 and the mirror wedge surface 804. As shown in FIG. 10, the light paths based on the mirror flat surface 802 cover vertical space that is not covered by the light paths based on the wedge mirror surface 804, and vice versa. The difference in the vertical space is 2C degrees, where C is the wedge mirror angle. Thus, as the mirror 800 rotates, the vertical space that is detected varies depending on whether the mirror flat surface 802 is facing the system components or whether the wedge mirror surface 804 is facing the system components. In accordance with aspects of the present disclosure, the spatial data generated based on the mirror flat surface 802 and based on the wedge mirror surface 804 can be collated or combined to provide higher vertical resolution than achievable by either surface alone.

The embodiments of FIGS. 8-10 are exemplary, and variations are contemplated. For example, in various embodiments, the scanning mirror may include more than two reflective surfaces and the surfaces can have multiple angles. Such variations are contemplated to be within the scope of the present disclosure.

Figure 11:
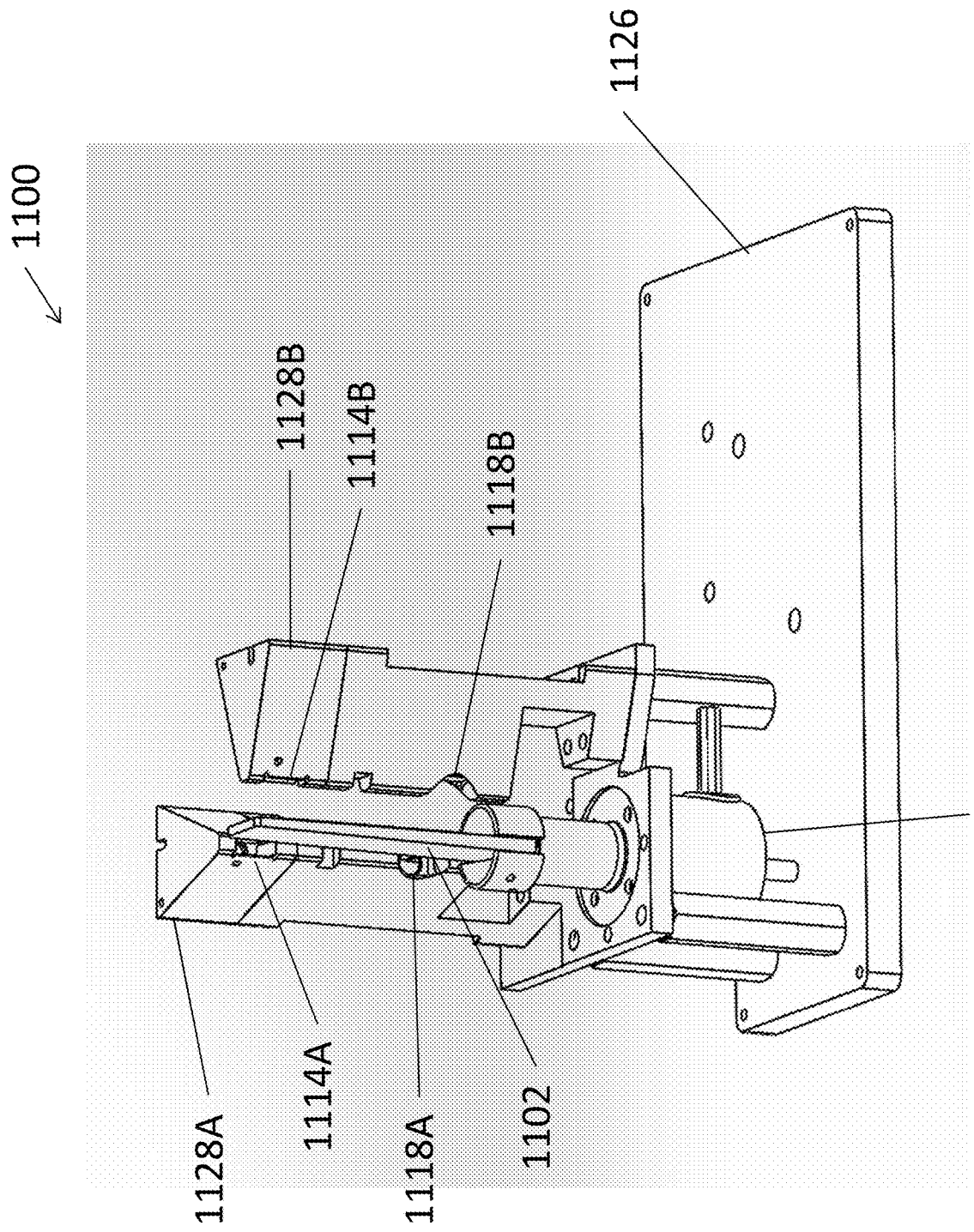
FIG. 11 is a diagram of an exemplary embodiment of the LiDAR system of FIG. 10, in accordance with aspects of the present disclosure.
Figure 12:
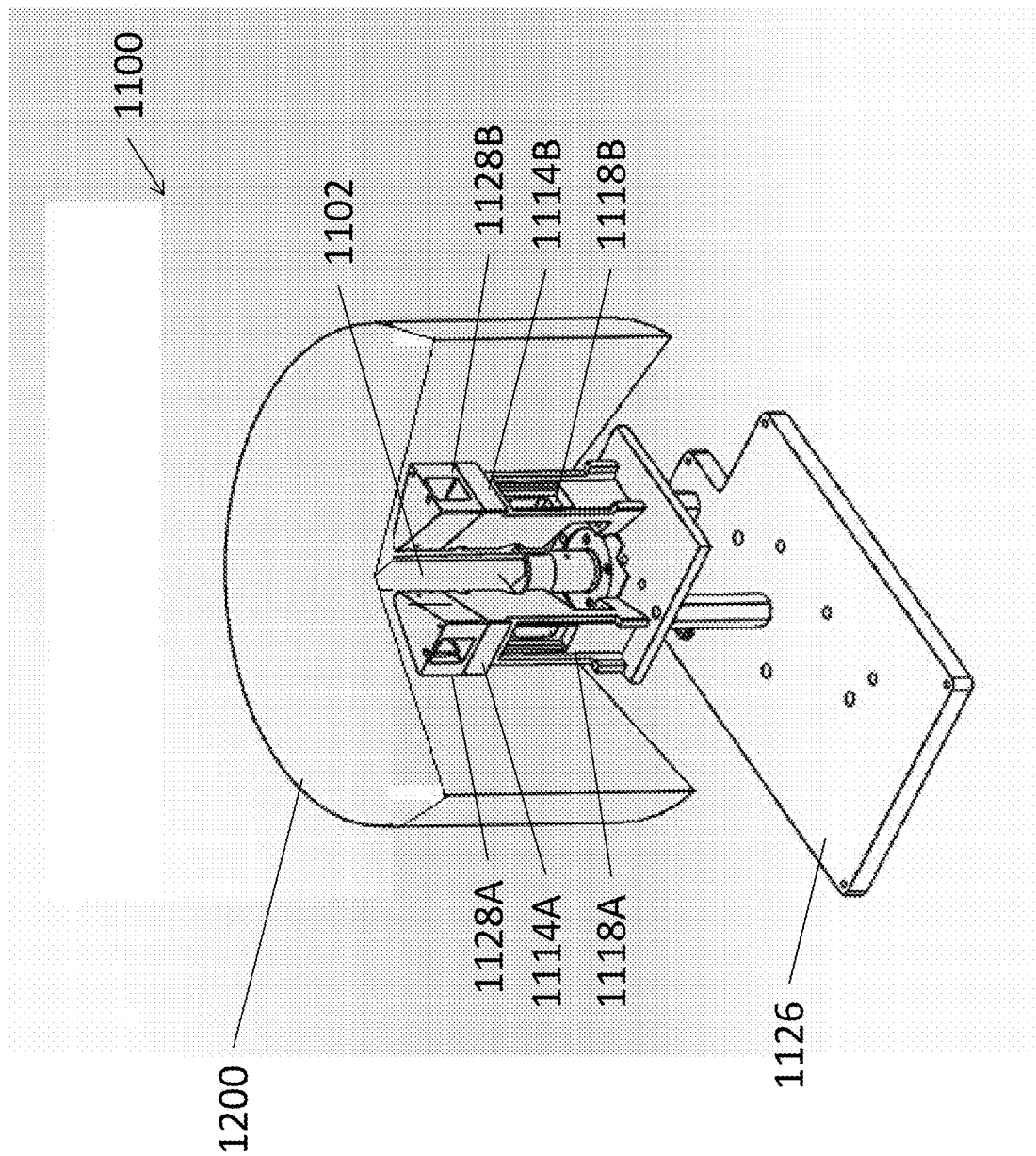
FIG. 12 is a diagram of an exemplary field of view of the LiDAR system of FIG. 11, in accordance with aspects of the present disclosure.
Figure 13:
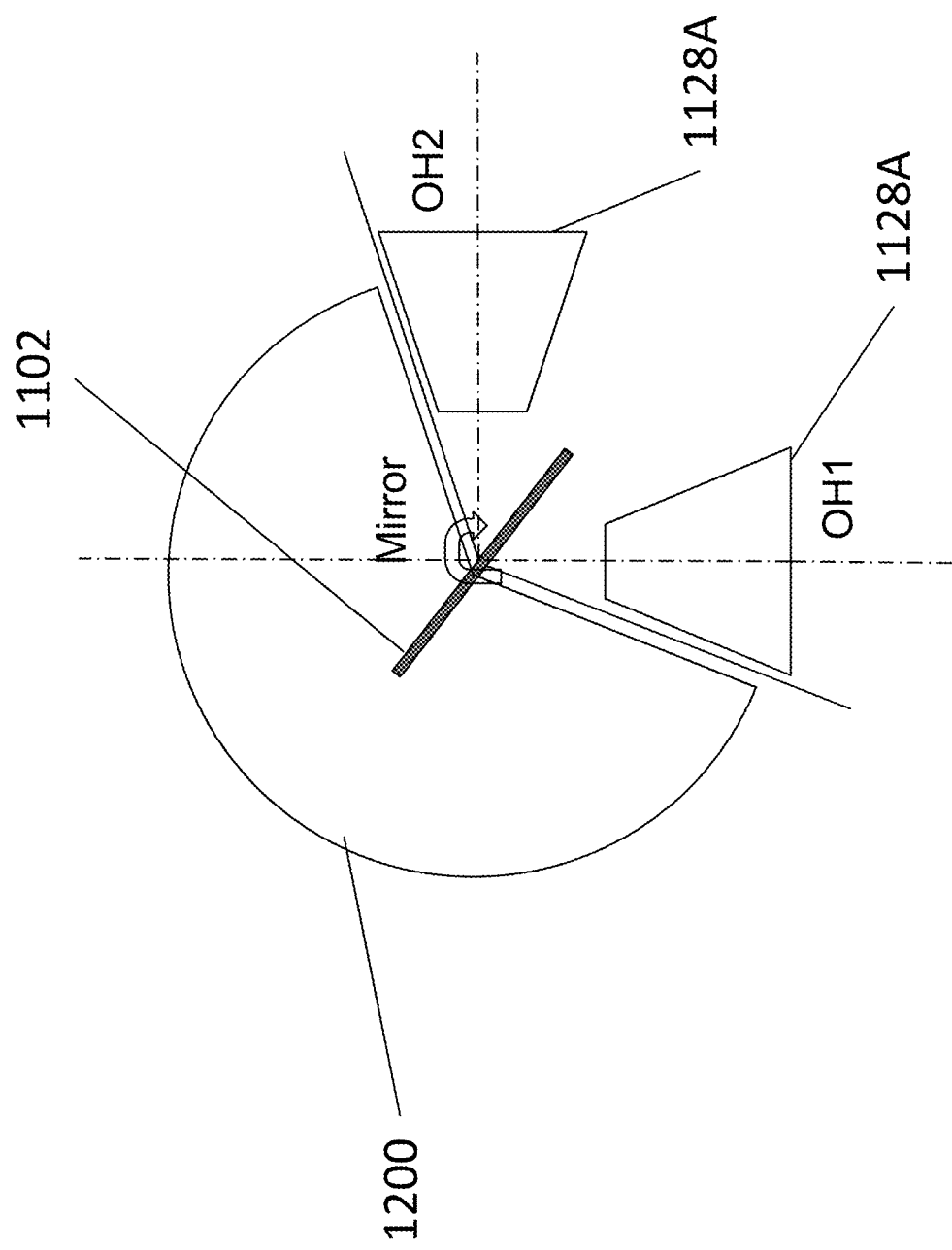
FIG. 13 is a diagram of a top view of the field of view of the LiDAR system of FIG. 11, in accordance with aspects of the present disclosure.

FIGS. 11-13 are exemplary embodiments of a LiDAR system with dual optical heads, in accordance with the present disclosure. The system 1100 includes two optical heads. As explained below, a dual optical head arrangement can increase a field of view of the disclosed LiDAR system.

A first housing 1128A includes an upper portion and a lower portion. A first emitting lens 1114A and a first light source (e.g., laser diode) are disposed in the upper portion of the first housing 1128A. The first emitting lens 1114A is positioned to receive light emitted from the first light source and produce a first shaped beam. A second housing 1128B includes an upper portion and a lower portion. A second emitting lens 1114B and a second light source are disposed in the upper portion of the second housing 1128B. The second emitting lens 1114B is positioned to receive light emitted from the second light source and produce a second shaped beam.

In various embodiments, a motor 1120 is rotatably coupled to a scanning mirror 1102, which is disposed on the base 1126. The scanning mirror 1102 is positioned to receive the shaped beams emitted by the first and second emitting lenses 1114A, 1114B, and redirect the shaped beams towards a near field object within a field of view of the dual-optical head system 1100. The scanning mirror 1102 can be a flat mirror, a wedge mirror, or a combination thereof.

In the illustrated embodiment, a first collection lens 1118A and a first light detector (not shown) are located at the lower portion of the first housing 1128A. A second collection lens 1118A and a second light detector (not shown) are interposed at the lower portion of the second housing 1128B. The first and second housings 1128A, 1128B are disposed on a base 1126. The embodiment of FIG. 11 is configured such that the tangential planes of the first emitting lens 1114A and the first collection lens 1118A are coincident with the rotational axis of the scanning mirror 1102. Also, the tangential planes of the second emitting lens 1114B and the second collection lens 1118B are coincident with the rotational axis of the scanning mirror 1102. FIG. 12 shows a perspective view of the system of FIG. 11 and illustrates an exemplary field of view 1200 of the dual optical head system 1100. FIG. 13 shows a top view of the system of FIG. 11 and illustrates a top-down view of the field of view 1200. The field of view 1200 provided by the dual optical head system 100 is larger than the field of view provided by a single optical system such as the system of FIG. 3.

As used herein, the term "robot," "robot vehicle," "robot fleet," "vehicle," "all-terrain vehicle," and like terms are used to indicate a mobile machine that transports cargo, items, and/or goods. Typical vehicles include cars, wagons, vans, unmanned motor vehicles (e.g., tricycles, trucks, trailers, buses, etc.), unmanned railed vehicles (e.g., trains, trams, etc.), unmanned watercraft (e.g., ships, boats, ferries, landing craft, barges, rafts, etc.), aerial drones, unmanned hovercraft (air, land and water types), unmanned aircraft, and even including unmanned spacecraft.

As used herein, the term "server," "computer server," "central server," "main server," and like terms are used to indicate a computer or device on a network that manages the fleet resources, namely the robot vehicles.

As used herein, the term "controller" and like terms are used to indicate a device that controls the transfer of data from a computer to a peripheral device and vice versa. For example, disk drives, display screens, keyboards, and printers all require controllers. In personal computers, the controllers are often single chips. As used herein the controller is commonly used for managing access to components of the robot such as the securable compartments.

As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task. As used herein the fleet management module includes software modules for managing various aspects and functions of the robot fleet.

As used herein, the term "processor," "digital processing device" and like terms are used to indicate a microprocessor or central processing unit (CPU). The CPU is the electronic circuitry within a computer that carries out the instructions of a computer program by performing the basic arithmetic, logical, control and input/output (I/O) operations specified by the instructions.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatus used to store data or programs on a temporary or permanent basis. In some embodiments, the device is volatile memory and requires power to maintain stored information. In some embodiments, the device is non-volatile memory and retains stored information when the digital processing device is not powered. In some embodiments, the non-volatile memory includes flash memory. In some embodiments, the non-volatile memory includes dynamic random-access memory (DRAM). In some embodiments, the non-volatile memory includes ferroelectric random access memory (FRAM). In some embodiments, the non-volatile memory includes phase-change random access memory (PRAM). In some embodiments, the device is a storage device including, by way of non-limiting examples, CD-ROMs, DVDs, flash memory devices, magnetic disk drives, magnetic tapes drives, optical disk drives, and cloud computing based storage. In some embodiments, the storage and/or memory device is a combination of devices such as those disclosed herein.

In some embodiments, the digital processing device includes a display to provide visual information to a user. In some embodiments, the display is a cathode ray tube (CRT). In some embodiments, the display is a liquid crystal display (LCD). In some embodiments, the display is a thin film transistor liquid crystal display (TFT-LCD). In some embodiments, the display is an organic light emitting diode (OLED) display. In various some embodiments, on OLED display is a passive-matrix OLED (PMOLED) or active-matrix OLED (AMOLED) display. In some embodiments, the display is a plasma display. In some embodiments, the display is a video projector. In some embodiments, the display is interactive (e.g., having a touch screen or a sensor such as a camera, a 3D sensor, a LiDAR, a radar, etc.) that can detect user interactions/gestures/responses and the like. In still some embodiments, the display is a combination of devices such as those disclosed herein.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms or codes may be converted to, or expressed in, a programming language or computer program. The terms "programming language" and "computer program," as used herein, each include any language used to specify instructions to a computer, and include (but not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

The systems described herein may also utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A system comprising:
   a light source configured to emit light;
   an emitting lens positioned to obtain the emitted light and configured to produce a shaped beam;
   an optical element including a mirror having a rotational axis, the optical element positioned to:
      redirect the shaped beam toward a near field object to produce scattered light from the near field object, and
      redirect at least a portion of the scattered light; and
   a collection lens configured to focus the at least the portion of the scattered light that is reflected from the rotational axis of the optical element on a light detector, the collection lens including a tangential plane,
   wherein the emitting lens includes a tangential plane coincident with the rotational axis of the optical element and coincident with the tangential plane of the collection lens.

2. The system of claim 1, wherein the mirror includes at least one of a prism, a flat mirror, or a wedge mirror.

3. The system of claim 1, wherein the mirror includes at least one of a mirror with a separation or a collection of mirrors.

4. The system of claim 1, further comprising:
   a processor; and
   a memory including instructions which, when executed by the processor, cause the system to detect an object based on the portion of the scattered light on the light detector.

5. The system of claim 4, wherein the mirror includes a rotating speed, and
   wherein the instructions, when executed by the processor, further cause the system to:
      determine a rate of detection; and
      determine the rotating speed of the mirror based on at least one of the rate of detection or a field of view.

6. The system of claim 1, wherein the light source is a linear light source.

7. The system of claim 1, wherein the light source includes a laser diode array.

8. The system of claim 1, wherein the light source includes at least one of ultraviolet, visible, or near infrared light.

9. The system of claim 1, wherein the light detector includes at least one of a photodiode, a photomultiplier, or an avalanche photodiode array.

10. The system of claim 1, wherein the emitting lens includes at least one of a diffractive optical element or an array of lenses.

11. The system of claim 1, further comprising:
    a second light source configured to emit second light;
    a second emitting lens positioned to obtain the emitted second light and configured to produce a second shaped beam, wherein the optical element is positioned to obtain the second shaped beam and redirect the second shaped beam toward the near field object to produce second scattered light from the near field object, and to obtain and redirect at least a portion of the second scattered light; and
    a second collection lens configured to focus the at least the portion of the second scattered light on a second light detector, the second collection lens including a tangential plane,
    wherein the second emitting lens includes a tangential plane coincident with the rotational axis of the optical element and coincident with the tangential plane of the second collection lens.

12. A method comprising:
    emitting light from a light source;
    producing a shaped beam by an emitting lens positioned to obtain the emitted light;
    redirecting, by an optical element, the shaped beam toward a near field object to produce scattered light from the near field object;
    redirecting, by the optical element, at least a portion of the scattered light; and
    focusing, by a collection lens, the at least the portion of the scattered light that is reflected from a rotational axis of the optical element or the at least the portion of the scattered light that is at an intersection of the optical element and a tangential plane of the collection lens on a light detector.

13. The method of claim 12, wherein:
    the optical element includes a mirror having the rotational axis;
    the collection lens includes a tangential plane; and the emitting lens includes a tangential plane coincident with the rotational axis of the optical element and coincident with the tangential plane of the collection lens.

14. The method of claim 12, wherein:
the optical element includes a mirror having the rotational axis;
the collection lens includes a sagittal plane that is at least one of coincident with or parallel to a sagittal plane of the emitting lens;
the collection lens and the emitting lens are distributed on a left side and a right side, respectively, of the rotational axis of the mirror; and
a tangential plane of the emitting lens and the tangential plane of the collection lens are parallel to the rotational axis.

15. The method of claim 14, wherein the mirror includes at least one of a mirror with a separation or a collection of mirrors.

16. The method of claim 14, wherein the method further includes detecting an object based on the portion of the scattered light on the light detector.

17. The method of claim 16, wherein the mirror includes a rotating speed,
the method further comprising:
determining a rate of detection; and
determining the rotating speed of the mirror based on at least one of the rate of detection or a field of view.

18. The method of claim 12, wherein the light source is a linear light source.

19. The method of claim 12, wherein the light source includes a laser diode array.

20. A system comprising:
a light source configured to emit light;
an emitting lens positioned to obtain the emitted light and configured to produce a shaped beam;
an optical element including a mirror having a rotational axis, the optical element positioned to:
obtain the shaped beam and redirect the shaped beam toward a near field object to produce scattered light from the near field object, and
obtain and redirect at least a portion of the scattered light; and
a collection lens configured to focus the at least the portion of the scattered light that is at an intersection of the optical element and a tangential plane of the collection lens on a light detector,
wherein a sagittal plane of the collection lens and a sagittal plane of the emitting lens are coincident, and
wherein the collection lens and the emitting lens are distributed on a left side and a right side, respectively, of the rotational axis of the mirror.

* * * * *